United States Patent
Liu et al.

(10) Patent No.: US 11,919,826 B1
(45) Date of Patent: Mar. 5, 2024

(54) METHOD FOR ENHANCING COMPRESSIVE STRENGTH OF LEAD SMELTING WATER-QUENCHED SLAG-BASED CEMENTITIOUS MATERIAL BY MECHANICAL ACTIVATION

(71) Applicant: XI'AN UNIVERSITY OF ARCHITECTURE AND TECHNOLOGY, Xi'an (CN)

(72) Inventors: Wenhuan Liu, Xi'an (CN); Hui Li, Xi'an (CN); Zhongzhong Zhao, Xi'an (CN); Yongfeng Wan, Xi'an (CN); Renhao Du, Xi'an (CN); Yiwen Jiang, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 18/320,573

(22) Filed: May 19, 2023

(30) Foreign Application Priority Data

Mar. 28, 2022 (CN) .......................... 202210313751.3

(51) Int. Cl.
*C04B 28/08* (2006.01)
*C04B 7/147* (2006.01)
*C04B 7/19* (2006.01)
*C04B 7/38* (2006.01)
*C04B 7/52* (2006.01)
*C04B 28/04* (2006.01)
*C04B 40/02* (2006.01)

(52) U.S. Cl.
CPC ............... *C04B 7/19* (2013.01); *C04B 7/522* (2013.01); *C04B 28/04* (2013.01); *C04B 28/08* (2013.01); *C04B 40/024* (2013.01)

(58) Field of Classification Search
CPC ........... C04B 7/19; C04B 7/522; C04B 28/04; C04B 28/08; C04B 40/024; C04B 7/14; C04B 7/147; C04B 7/36; C04B 7/38; Y02P 40/10
See application file for complete search history.

(56) References Cited

U.S. PATENT DOCUMENTS

2013/0098272 A1* 4/2013 Hemmings ........... C04B 18/144
106/819

FOREIGN PATENT DOCUMENTS

| CN | 105565691 A | * | 5/2016 | |
|---|---|---|---|---|
| CN | 105565691 A | | 5/2016 | |
| CN | 111302741 A | * | 6/2020 | ............. C04B 28/04 |
| CN | 112723831 A | * | 4/2021 | |
| CN | 112723831 A | | 4/2021 | |
| WO | 2016045490 A1 | | 3/2016 | |

OTHER PUBLICATIONS

CN-112723831-A, machine translation (Year: 2021).*
CN-111302741-A, machine translation (Year: 2020).*
National Cement SC. Ordinary Portland Cement (OPC) [retrieved from the internet at Aug. 7, 2023 from <URL:https://nationalcementsc.com/products.php?what=opc>]. (Year: 2014).*
CN-105565691-A, machine translation (Year: 2016).*
National Lime Association (Lime, The Versatile Chemical, Fact Sheet) [retrieved from the internet at Aug. 8, 2023 from <URL: https://www.lime.org/documents/publications/free_downloads/fact-properties2007rev.pdf>] (Year: 2007).*
Mesh Sizing Chart [retrieved from the internet at Aug. 8, 2023 from <URL: https://www.valvesonline.com.au/references/mesh-sizing-chart/>] (Year: 2016).*
Wayback machine—Mesh Sizing Chart [retrieved from the internet at Aug. 8, 2023 from <URL: https://www.valvesonline.com.au/references/mesh-sizing-chart/>] (Year: 2016).*
Shen, W., Wang, Y., Zhang, T. et al. Magnesia modification of alkali-activated slag fly ash cement. J. Wuhan Univ. Technol.-Mat. Sci. Edit. 26, 121-125 (2011). DOI:10.1007/s11595-011-0182-8 (Year: 2011).*
Biosciences. Calcium chloride, dihydrate Safety Data Sheet [retrieved from the internet at Aug. 8, 2023 from <URL:https://cdn.gbiosciences.com/pdfs/msds/RC-030_msds.pdf>]. (Year: 2012).*

* cited by examiner

*Primary Examiner* — Anthony J Green
*Assistant Examiner* — Marites A Guino-O Uzzle
(74) *Attorney, Agent, or Firm* — Pilloff Passino & Cosenza; Rachel K. Pilloff; Sean A. Passino

(57) ABSTRACT

A method for enhancing compressive strength of a lead smelting water-quenched slag-based cementitious material by mechanical activation is provided, belonging to the technical field of solid waste resource treatment. The method includes following steps: grinding and activating water-quenched slag from lead smelting, then mixing with calcium-based solid waste, magnesium-based solid waste, magnesium oxide, portland cement and water, and performing a steam curing and a curing at normal temperature on cementitious material slurry obtained to obtain the lead smelting water-quenched slag-based cementitious material.

6 Claims, 3 Drawing Sheets

METHOD FOR ENHANCING COMPRESSIVE STRENGTH OF LEAD SMELTING WATER-QUENCHED SLAG-BASED CEMENTITIOUS MATERIAL BY MECHANICAL ACTIVATION

CROSS-REFERENCE TO RELATED APPLICATIONS

This application claims priority to Chinese Patent Application No. 202210313751.3, filed on Mar. 28, 2022, the contents of which are hereby incorporated by reference.

TECHNICAL FIELD

The application belongs to the technical field of solid waste resource treatment, and particularly relates to a method for enhancing compressive strength of a lead smelting water-quenched slag-based cementitious material by mechanical activation.

BACKGROUND

Water-quenched slag from lead smelting is the smelting waste slag formed by quick water-cooling in high-temperature melting state and is able to be as a cementitious material by stimulating its potential hydration activity under certain physical and chemical conditions. According to statistics, the lead smelting system discharges 7,100 tons of waste residue for every 10,000 tons of produced lead. A large amount of water-quenched slag from the lead smelting not only encroaches on land, but also causes environmental problems and threatens the life safety of residents. On the other hand, if the water-quenched slag from the lead smelting is not treated harmlessly and buried at will, irreparable harms to the environment is caused and environmental safety and health of people are seriously affected.

Therefore, it is imperative to develop a method of utilizing the water-quenched slag from the lead smelting in a large scale. The water-quenched slag from the lead smelting is a solid waste formed by water quenching and quick cooling and has certain potential activity. Therefore, the application of the water-quenched slag from the lead smelting in the field of building materials has been widely explored in recent years. On the other hand, it is worth noting that the mineral crystal phase in the water-quenched slag from the lead smelting is large and complete, which leads to low potential activity and is difficult to be applied in a large scale. Therefore, there is an urgent need for a technical means to improve the potential hydration activity of the water-quenched slag from the lead smelting, and then improve properties of materials prepared by the water-quenched slag from the lead smelting as raw materials.

SUMMARY

Aiming at the shortcomings in the prior art, the application provides a method for enhancing compressive strength of a lead smelting water-quenched slag-based cementitious material by mechanical activation, and the performance of the lead smelting water-quenched slag-based cementitious material is obviously improved by adopting a mechanical activation mode.

In order to achieve the above purpose, the present application provides the following technical scheme.

The application provides a method for enhancing compressive strength of a lead smelting water-quenched slag-based cementitious material by mechanical activation. The method for enhancing the compressive strength of the lead smelting water-quenched slag-based cementitious material by mechanical activation includes the following steps: grinding and activating lead smelting water-quenched slag, then mixing with calcium-based solid waste, magnesium-based solid waste, magnesium oxide, portland cement and water, and performing a steam curing and a curing at normal temperature on obtained cementitious material slurry to obtain the lead smelting water-quenched slag-based cementitious material.

The lead smelting water-quenched slag is ground to a particle size of 2.0-120 microns ($\mu m$), and a particle size of micropowder of the water-quenched slag from lead smelting is expressed by D50 (D for diameter).

Optionally, the lead smelting water-quenched slag is dried at 100-110° C. for 22-24 hours before the grinding.

Optionally, a mass ratio of the lead smelting water-quenched slag, the calcium-based solid waste, the magnesium-based solid waste, the magnesium oxide, the portland cement and the water is 1000:(50-70):(40-60):(60-80):(90-110):(230-250).

Optionally, the grinding is a ball milling or a vertical grinding.

Optionally, the calcium-based solid waste is sinjarite with a particle size of 2.0-60 $\mu m$.

Optionally, the magnesium-based solid waste is bischofite with a particle size of 2.0-60 $\mu m$.

Optionally, the portland cement has a strength of 42.5 and has a particle size of 2.0-60 $\mu m$.

Optionally, the steam curing is carried out at 58-62° C. for 22-24 hours; the curing at a normal temperature is carried out for 28-32 days.

Compared with the prior art, the application has the following beneficial effects.

According to the application, the lead smelting water-quenched slag is ground to a smaller fineness, so the finer the raw material particles are, the larger the surface area is, more broken bonds appear on the particle surfaces, and the reaction activity is better stimulated. At the same time, the crystal structure is destroyed in the grinding process, which leads to crystal deformation and reduced crystallinity, which is helpful for water molecules to enter the mineral, accelerate the hydration reaction rate and deepen the hydration reaction degree, thus forming more water-soluble amorphous substances and improving the performance of lead smelting water-quenched slag-based cementitious materials. The binding of cementing substances between particles excited by activator is closer, which makes the whole structure of lead smelting slag-based cementitious materials more compact and enhances the compressive strength of cementitious materials.

According to the application, the activity of the lead smelting water-quenched slag is improved by a mechanical activation mode, so the compressive strength of the lead smelting water-quenched slag-based cementitious material is enhanced, large-scale resource utilization of the lead and zinc smelting slag is realized, the problem of environmental pollution caused by the lead smelting water-quenched slag is effectively solved, and good environmental and economical benefits are achieved.

According to the application, the compressive strength of a specimen prepared by using a plurality of solid wastes to synergistically stimulate a large amount of lead smelting water-quenched slag is able to reach 50 megapascals (Mpa), and the lead smelting water-quenched slag may be applied in engineering fields, such as building construction, road construction, so the cement consumption is significantly reduced, the cost is reduced, and the resource utilization of solid wastes is promoted at the same time, bringing about good environmental and economic benefits and facilitating large-scale popularization and application.

BRIEF DESCRIPTION OF THE DRAWINGS

In order to explain the embodiments of the present application more clearly, the drawings needed in the embodiments will be briefly introduced below. Obviously, the drawings described below are only some embodiments of the present application, and other drawings may be obtained according to these drawings without creative work for ordinary people in the field.

DETAILED DESCRIPTION OF THE EMBODIMENTS

Figure 1:
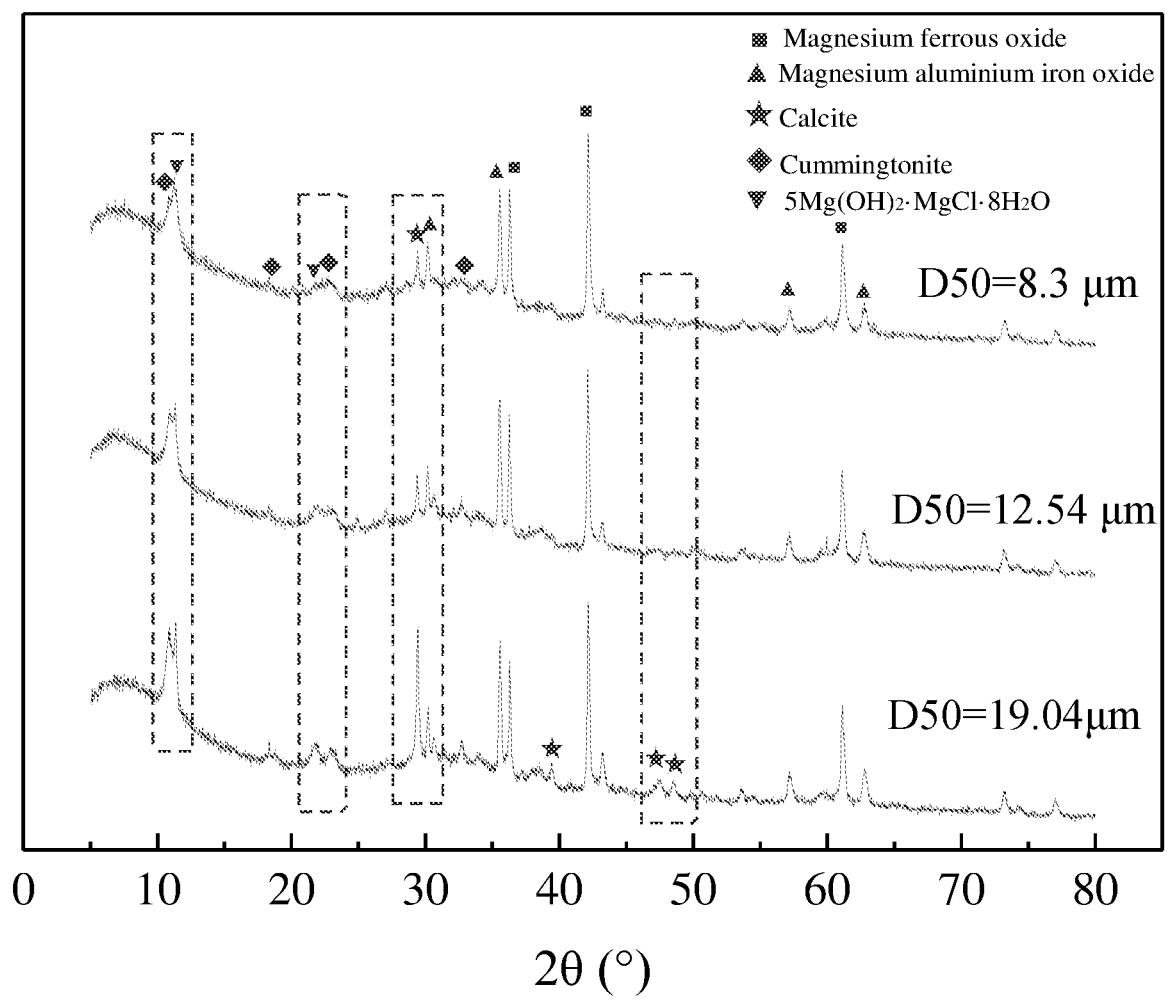
FIG. 1 is the X-ray diffraction pattern of lead melting water-quenched slag-based cementitious materials prepared in embodiment 1, embodiment 3 and embodiment 5.

A number of exemplary embodiments of the present application will now be described in detail, and this detailed description should not be considered as a limitation of the present application, but should be understood as a more detailed description of certain aspects, characteristics and embodiments of the present application. It should be understood that the terminology described in the present application is only for describing specific embodiments and is not used to limit the present application.

In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges may be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein may also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present application without departing from the scope or spirit of the present application. Other embodiments will be obvious to the skilled person from the description of the application. The description and example of that present application are exemplary only.

The terms "including", "comprising", "having" and "containing" used in this article are all open terms, which means including but not limited to.

Unless otherwise specified, the "parts" mentioned in the present application are all based on parts by weight.

In the following embodiments, water-quenched slag from lead smelting adopted is the smelting slag generated after being rapidly cooled by water in a high-temperature melting state during a lead-zinc smelting process, and main components and mass percentages are: silica 18.1%, calcium oxide 9.97%, aluminium oxide 4.74%, iron oxide 53.51%, magnesium oxide 2.09% and zinc oxide 4.85%.

A particle size of sinjarite adopted is 2.0-60 μm. A particle size of bischofite is 2.0-60 μm. The magnesium oxide used is commercially available light-burned magnesium oxide. Cement used is portland cement with a strength grade of 42.5 and a particle size of 2.0-60 μm. Water is tap water.

Above will not be repeated.

Figure 3:
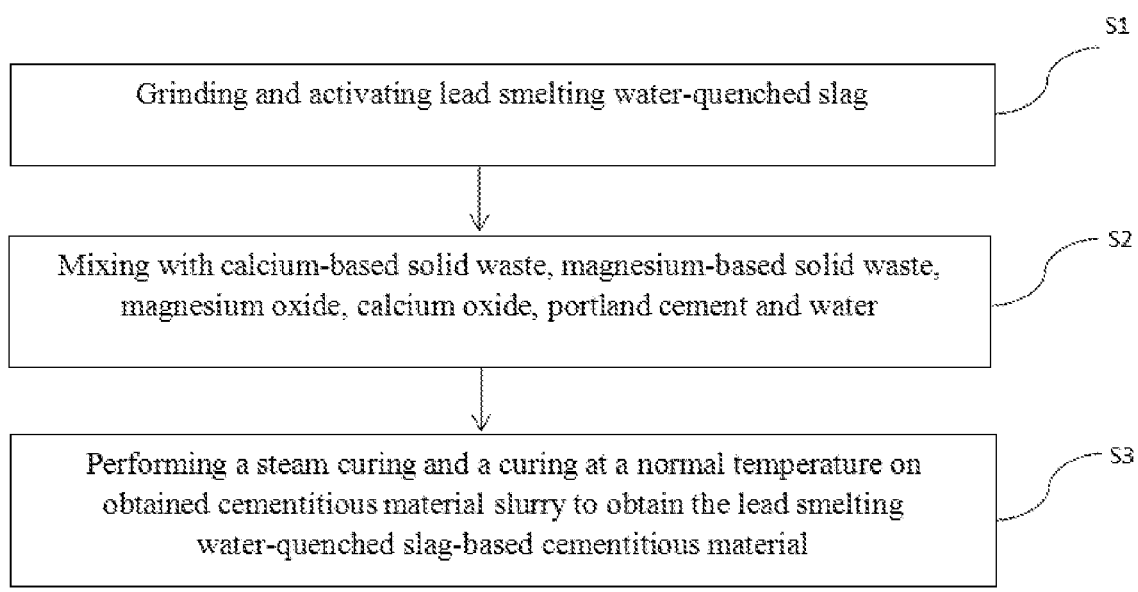
FIG. 3 is flowchart of a preparation method of a lead smelting water-quenched slag-based cementitious material.

As shown in FIG. 3, a preparation method of a lead smelting water-quenched slag-based cementitious material includes following steps:

S1: grinding and activating lead smelting water-quenched slag;

S2: mixing with calcium-based solid waste, magnesium-based solid waste, magnesium oxide, calcium oxide, portland cement and water; and S3: performing a steam curing and a curing at a normal temperature on obtained cementitious material slurry to obtain the lead smelting water-quenched slag-based cementitious material.

Embodiment 1

A preparation method of a lead smelting water-quenched slag-based cementitious material includes following steps:

S1: weighing 1000 parts of granular water-quenched slag from lead smelting, 60 parts of the sinjarite, 50 parts of the bischofite, 70 parts of the magnesium oxide, 100 parts of the portland cement and 240 parts of the water according to parts by weight; drying the granular water-quenched slag from the lead smelting at 100° C. for 24 hours, and then grinding the granular water-quenched slag from the lead smelting in a ball mill for 2.0 hours to obtain micropowder of the water-quenched slag from the lead smelting with a particle size of 19.04 μm;

S2: adding the micropowder of the water-quenched slag from the lead smelting, the sinjarite, the bischofite, the magnesium oxide, the portland cement and the water into a clean slurry stirring pot, and fully stirring to uniformly mix them to obtain cementitious material slurry; and S3: pouring the cementitious material slurry prepared in the S2 into a mold, fully tamping, vibrating on a vibrating table for 60 seconds, smoothing a surface, putting into a steam curing box, setting a temperature of the curing box as 60° C., curing for 24 hours, taking out from the curing box, removing the mold, curing at normal temperature to 28 days, and taking out a test block to complete the preparation of the lead smelting slag-based cementitious material.

Embodiments 2-5, Comparative Examples 1-2

Embodiments 2-5 and Comparative examples 1-2 are the same as embodiment 1, but Embodiments 2-5 and Comparative examples 1-2 differ in the grinding time in the S1 and particle sizes of micropowder of the water-quenched slag from the lead smelting obtained as shown in Table 1.

TABLE 1

| Group | Grinding time | Particle sizes of micropowder of the water-quenched slag from the lead smelting/μm |
|---|---|---|
| Embodiment 1 | 2 hours | 19.04 |
| Embodiment 2 | 2.5 hours | 15.80 |
| Embodiment 3 | 3 hours | 12.54 |
| Embodiment 4 | 3.5 hours | 10.42 |
| Embodiment 5 | 4 hours | 8.30 |
| Comparative example 1 | 1.0 hour | 43.50 |
| Comparative example 2 | 0.5 hour | 60.45 |

The compressive strength of the cementitious materials for 3 days, 7 days and 28 days prepared in embodiments 1-5 and comparative examples 1-2 are tested, and the results are shown in Table 2.

TABLE 2

| | Compressive strength/Mpa | | |
|---|---|---|---|
| Group | 3 days | 7 days | 28 days |
| Embodiment 1 | 13.6 | 17.0 | 20.5 |
| Embodiment 2 | 15.2 | 19.6 | 25.7 |
| Embodiment 3 | 22.3 | 25.9 | 29.3 |
| Embodiment 4 | 27.5 | 36.4 | 42.9 |
| Embodiment 5 | 39.8 | 43.8 | 50.1 |
| Comparative example 1 | 11.9 | 15.6 | 19.3 |
| Comparative example 2 | 9.2 | 13.2 | 16.5 |

The effect of mechanical activation on strengthening the compressive strength of water-quenched slag-based cementitious materials in lead smelting is further analyzed from the microstructure.

X-ray diffraction (XRD) and mercury porosimeter are used to further analyze the characteristics of high content of lead melting water-quenched slag-based eco-cementitious materials and to analyze the mechanism of mechanical activation to enhance the compressive strength of cementitious materials.

The test specimens are selected from embodiments 1, 3 and 5 for relevant test and analysis.

1) XRD Analysis of Lead Smelting Water-Quenched Slag-Based Cementitious Materials with Different Fineness As shown in FIG. 1, the XRD of cementitious materials obtained by stimulating water-quenched slag with different fineness from the lead smelting in embodiments 1, 3 and 5 shows that a diffraction peak intensity of the block decreases with the decrease of particle sizes of raw materials, indicating that the amorphous phase in the raw materials may participate in the hydration reaction with the activator. This proves once again that the water-quenched slag from the lead smelting has chemical reactivity, and the reduction of particle size of the water-quenched slag from lead smelting promotes the improvement of hydration degree. At the same time, it can be determined that phase 518, calcite and cummingtonite are the main crystalline phases. A diffraction peak of the calcite decreases around 30° (2θ) with the decrease of the particle size of the raw materials, and even disappears at 45-55° (2θ). The reason may be that the reduction of particle size of the water-quenched slag from the lead smelting deepens the hydration reaction and produces a denser structure to prevent the invasion of carbon dioxide. During the stimulating process, a diffraction peak of the phase 518 produced by the reaction between the magnesium oxide and the bischofite decreases with the decrease of particle size, which shows that more broken bonds are exposed on the particle surface to react with the magnesium oxide. This result is consistent with the compressive strength of the test block.

Figure 2:
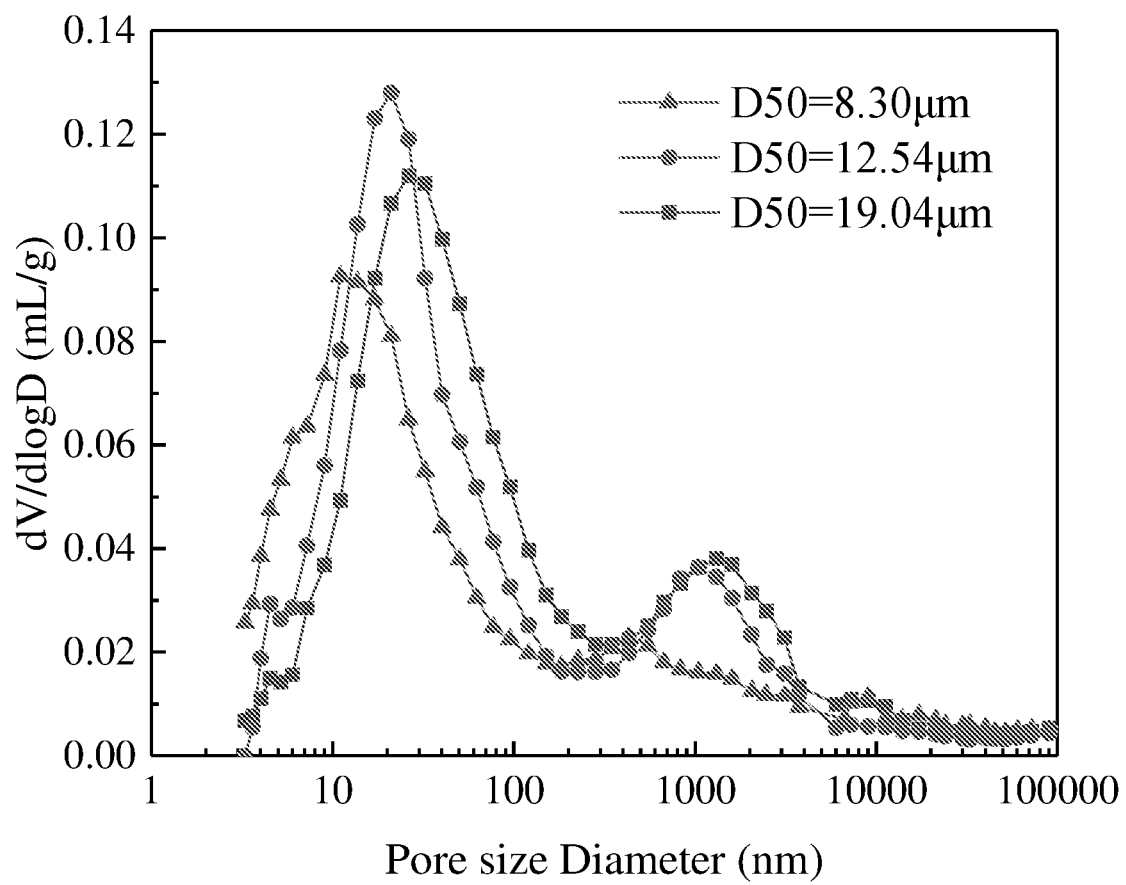
FIG. 2 is a mercury intrusion porosimetry (MIP) diagram of lead melting water-quenched slag-based cementitious materials prepared in embodiment 1, embodiment 3 and embodiment 5.

(2) Mercury Intrusion Porosimetry (MIP) Analysis of the Lead Smelting Slag-Based Cementitious Materials with Different Fineness A pore size distribution of lead smelting water-quenched slag-based cementitious materials at age of 28 days is shown in FIG. 2, and a cumulative pore volume is shown in Table 3. In hardened slurry, there are a gel pore (<10 nanometers (nm)), a transition pore (10-100 nm), a capillary pore (100-1000 nm) and a macropore (>1000 nm) according to the pore size.

TABLE 3

| Group | D50/μm | Porosity/% | Mean pore size/nm | Pore size distribution/% | | | |
|---|---|---|---|---|---|---|---|
| | | | | <10 nm | 10-100 nm | 100-1000 nm | >1000 nm |
| Embodiment 5 | 8.3 | 26.5 | 17.07 | 20.21 | 47.46 | 15.17 | 17.16 |
| Embodiment 3 | 12.54 | 29.9 | 23.78 | 10.55 | 57.01 | 15.48 | 16.95 |
| Embodiment 1 | 19.04 | 31.5 | 32 | 6.33 | 54.54 | 18.3 | 20.83 |

It can be seen from FIG. 2 and Table 3 that with the decrease of the particle size of water-quenched slag from the lead smelting, the pore structure gradually moves towards the gel pore, indicating that the pore size of the block decreases. It can also be clearly seen from Table 3 that with the decrease of the particle size of the water-quenched slag from the lead smelting, the mean pore size of gel blocks decreases from 32 nm to 23.78 nm and 17.07 nm, and the porosity decreases from 31.5% to 29.9% and 26.5% respectively. XRD and Fourier Transform Infrared Spectrometer (FTIR) results show that the smaller the particle size, the higher the gelation degree and the higher the density, which leads to the decrease of the total porosity of the gel block. Because the gel in the hydration products of lead smelting water-quenched slag-based cementitious materials plays a major role in the compressive strength of the test block, the pore size distribution results also confirm the compressive strength results.

To sum up, it can be seen that the method for strengthening the lead smelting water-quenched slag-based cementitious material by mechanical activation of the present application only greatly improves the pass rate of the water-quenched slag from the lead smelting (the content of water-quenched slag from the lead smelting is 70%), but also effectively improves the compressive strength of the lead smelting water-quenched slag-based cementitious material, so that the compressive strength the lead smelting water-quenched slag-based cementitious material reaches more than 50 MPa. The lead smelting water-quenched slag-based cementitious material may be used in engineering fields with higher requirements for compressive strength, such as building construction and road construction, and has good environmental and economical benefits. According to the application, it is creatively found that mechanical activation has a significant influence on regulating and controlling the compressive strength of lead smelting water-quenched slag-based cementitious materials, and this finding also makes the lead smelting water-quenched slag-based cementitious material better applied to a plurality of fields with different requirements on compressive strength.

Embodiment 6

A preparation method of a lead smelting water-quenched slag-based cementitious material includes following steps:
S1: weighing 1000 parts of granular water-quenched slag from the lead smelting, 60 parts of the sinjarite, 50 parts of the bischofite, 70 parts of the magnesium oxide, 100 parts of the portland cement and 240 parts of the water according to parts by weight; drying the granular water-quenched slag from the lead smelting at 100° C. for 24 hours, placing in a ball mill, adding anhydrous sodium carbonate with a particle size of 10-50 μm and being 5% of the weight of the granular water-quenched slag from the lead smelting, grinding for 4 hours to obtain micropowder of the water-quenched slag from the lead smelting;
S2: adding the micropowder of the water-quenched slag from the lead smelting, the sinjarite, the bischofite, the magnesium oxide, the portland cement and the water into a clean slurry stirring pot, and fully stirring to uniformly mix them to obtain cementitious material slurry; and
S3: pouring the cementitious material slurry prepared in the S2 into a mold, fully tamping, vibrating on a vibrating table for 60 seconds, smoothing a surface, putting into a steam curing box, setting a temperature of the curing box as 60° C., curing for 24 hours, taking out from the curing box, removing the mold, curing at a normal temperature for 28 days, and taking out a test block to complete the preparation of the lead smelting slag-based cementitious material.

The compressive strengths of the water-quenched slag-based cementitious materials for 3 days, 7 days and 28 days prepared in this example is tested, and the results are 40.5 MPa, 45.3 MPa and 51.8 MPa, respectively.

Embodiment 7

A preparation method of a lead smelting water-quenched slag-based cementitious material includes following steps:
S1: weighing 1000 parts of granular water-quenched slag from the lead smelting, 60 parts of the sinjarite, 50 parts of the bischofite, 70 parts of the magnesium oxide, 100 parts of the portland cement, 240 parts of the water and 50 parts of calcium oxide with a particle size of 10-50 μm according to parts by weight; drying the granular water-quenched slag from the lead smelting at 100° C. for 24 hours, placing in a ball mill, adding anhydrous sodium carbonate with a particle size of 10-50 μm and being 5% of the weight of the granular water-quenched slag from the lead smelting, grinding for 4 hours to obtain micropowder of the water-quenched slag from the lead smelting;
S2: adding the micropowder of the water-quenched slag from the lead smelting, the sinjarite, the bischofite, the magnesium oxide, the portland cement, the calcium oxide and the water into a clean slurry stirring pot, and fully stirring to uniformly mix them to obtain cementitious material slurry; and
S3: pouring the cementitious material slurry prepared in the S2 into a mold, fully tamping, vibrating on a vibrating table for 60 seconds, smoothing a surface, putting into a steam curing box, setting a temperature of the curing box as 60° C., curing for 24 hours, taking out from the curing box, removing the mold, curing at normal temperature to 28 days, and taking out a test block to complete the preparation of the lead smelting slag-based cementitious material.

The compressive strengths of the water-quenched slag-based cementitious materials for 3 days, 7 days and 28 days prepared in this embodiment is tested, and the results are 41.3 MPa, 46.0 MPa and 52.7 MPa, respectively.

The above is only preferred embodiments of the present application, and the scope of protection of the present application is not limited thereto. An equivalent replacement or change made by any person skilled in the art within the technical scope disclosed by the present application according to the technical scheme and inventive concept of the present application should fall in the scope of protection of the present application.

What is claimed is:

1. A method for enhancing compressive strength of a lead smelting water-quenched slag-based cementitious material by mechanical activation, comprising following steps: grinding and activating lead smelting water-quenched slag; then mixing with calcium-based solid waste, magnesium-based solid waste, magnesium oxide, calcium oxide, Portland cement and water; and performing a steam curing and a curing at a room temperature on obtained cementitious material slurry to obtain the lead smelting water-quenched slag-based cementitious material,
wherein the lead smelting water-quenched slag is ground to a particle size of 2.0-120 μm;
the lead smelting water-quenched slag is dried at 100-110° C. for 22-24 h before the grinding, and anhydrous sodium carbonate with a particle size of 10-50 μm is added in an amount of 5% of a weight of the lead smelting water-quenched slag;
a particle size of the calcium oxide is 10-50 μm; and
a mass ratio of the lead smelting water-quenched slag, the calcium-based solid waste, the magnesium-based solid waste, the magnesium oxide, the Portland cement and the water is 1000:(50-70):(40-60):(60-80):(90-110):(230-250).

2. The method according to claim 1, wherein the grinding is a ball milling or a vertical grinding.

3. The method according to claim 1, wherein the calcium-based solid waste is sinjarite with a particle size of 2.0-60 μm.

4. The method according to claim 1, wherein the magnesium-based solid waste is bischofite with a particle size of 2.0-60 μm.

5. The method according to claim 1, wherein the Portland cement has a strength of 42.5 R and has a particle size of 2.0-60 μm.

6. The method according to claim 1, wherein the steam curing is carried out at 58-62° C. for 22-24 h; and the curing at the room temperature is carried out for 28-32 days.

\* \* \* \* \*